(12) United States Patent
Morin et al.

(10) Patent No.: US 11,586,691 B2
(45) Date of Patent: Feb. 21, 2023

(54) UPDATING A PROFILE OF AN ONLINE SYSTEM USER TO INCLUDE AN AFFINITY FOR AN ITEM BASED ON AN IMAGE OF THE ITEM INCLUDED IN CONTENT RECEIVED FROM THE USER AND/OR CONTENT WITH WHICH THE USER INTERACTED

(71) Applicant: Meta Platforms, Inc., Menlo Park, CA (US)

(72) Inventors: Steve Morin, San Francisco, CA (US); Xuewei Ouyang, San Francisco, CA (US); Martin Mroz, San Francisco, CA (US); Anuj Madan, San Mateo, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 352 days.

(21) Appl. No.: 16/880,837

(22) Filed: May 21, 2020

(65) Prior Publication Data

US 2021/0365510 A1 Nov. 25, 2021

(51) Int. Cl.
*G06F 16/9535* (2019.01)
*G06F 16/23* (2019.01)
(Continued)

(52) U.S. Cl.
CPC ...... *G06F 16/9535* (2019.01); *G06F 16/2379* (2019.01); *G06F 16/535* (2019.01);
(Continued)

(58) Field of Classification Search
CPC ... G06N 20/00; G06F 16/535; G06F 16/9538; G06F 16/9535; G06F 16/2379; G06Q 30/0643; G06Q 30/0631; G06Q 50/01
See application file for complete search history.

(56) References Cited

U.S. PATENT DOCUMENTS

| 10,990,950 B2 * | 4/2021 | Garner | G06Q 20/42 |
| 2009/0058615 A1 * | 3/2009 | Schultz | G01S 19/14 340/10.4 |

(Continued)

OTHER PUBLICATIONS

European Search Report for European Application No. 21171776.4, dated Oct. 11, 2021, 2 pages.

*Primary Examiner* — Etienne P Leroux
(74) *Attorney, Agent, or Firm* — Fenwick & West LLP

(57) ABSTRACT

An online system receives a content item including an image from a content-providing user and/or receives an interaction with the content item from a viewing user. The online system accesses a machine-learning model that is trained based on a set of images of items associated with an entity and attributes of each image. The online system applies the model to predict a probability that the content item includes an image of an item associated with the entity based on attributes of the image included in the content item. Based on the predicted probability, the online system updates a profile of the user (i.e., the content-providing user and/or the viewing user) to include an affinity for the item. Upon determining an opportunity to present content to the user, the online system selects content for presentation to the user based on the profile and sends the content for presentation to the user.

19 Claims, 4 Drawing Sheets

(51) Int. Cl.
  *G06N 20/00*    (2019.01)
  *G06F 16/535*   (2019.01)
  *G06F 16/9538*  (2019.01)
  *G06Q 30/0601*  (2023.01)
  *G06Q 50/00*    (2012.01)

(52) U.S. Cl.
  CPC ......... *G06F 16/9538* (2019.01); *G06N 20/00* (2019.01); *G06Q 30/0631* (2013.01); *G06Q 30/0643* (2013.01); *G06Q 50/01* (2013.01)

(56) References Cited

U.S. PATENT DOCUMENTS

| | | | |
|---|---|---|---|
| 2018/0285748 A1* | 10/2018 | Husain | G06Q 50/01 |
| 2018/0302682 A1  | 10/2018 | Saxena et al. | |
| 2019/0102466 A1* | 4/2019  | Wang | G06Q 50/01 |
| 2019/0220694 A1* | 7/2019  | Biswas | G06V 10/751 |
| 2019/0295148 A1* | 9/2019  | Lefkow | G06Q 10/0833 |
| 2021/0073583 A1* | 3/2021  | Dagan | G06N 20/00 |

* cited by examiner

UPDATING A PROFILE OF AN ONLINE SYSTEM USER TO INCLUDE AN AFFINITY FOR AN ITEM BASED ON AN IMAGE OF THE ITEM INCLUDED IN CONTENT RECEIVED FROM THE USER AND/OR CONTENT WITH WHICH THE USER INTERACTED

TECHNICAL FIELD

This disclosure relates generally to online systems, and more specifically to updating a profile of an online system user to include an affinity for an item based on an image of the item included in content received from the user and/or content with which the user interacted.

BACKGROUND

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for allowing users to share content by creating content items for presentation to additional online system users. For example, users may share photos or videos they have uploaded by creating content items that include the photos or videos that are presented to additional users to whom they are connected in the online system.

Conventionally, online systems select content for presentation to their users based on the users' affinity for various items (e.g., products) or topics (e.g., specific or general categories of products or services, geographic locations, hobbies, sports, music, movies, etc.) that may be associated with the content. A user's affinity for an item or a topic may be explicitly shared by the user with an online system (e.g., when building the user's profile to be maintained in the online system). A user's affinity for an item or a topic also may be inferred by an online system if information describing the item or topic is included in content received from the user and/or if the information is included in content with which the user has interacted (e.g., in a tag, in a caption, etc.). For example, suppose that a content item received from an online system user includes an image of a jacket, in which the content item also includes a tag that describes the jacket (e.g., a style and a brand of the jacket). In this example, additional users of the online system to whom the content item is presented may interact with the content item (e.g., by expressing a preference for the content item, commenting on the content item, saving the content item, sharing the content item, etc.). In the above example, based on the tag, the online system may infer that the user from whom the content item was received and the users who interacted with the content item have an affinity for the style and/or the brand of jacket and subsequently may select content items that are associated with the style and/or the brand of jacket for presentation to the users.

However, online systems may fail to infer items or topics for which their users are likely to have affinities if content received from the users and/or content with which the users have interacted does not include information describing items or topics associated with the content. In the above example, if the content item does not include the tag or any other information that describes the jacket, the online system may be unable to infer the users' affinities for the style and/or the brand of jacket and thus will be unable to identify content items associated with the style and/or the brand of jacket for presentation to the users. Hence, online systems may fail to present relevant content to online system users, which may degrade user experience.

SUMMARY

Online systems conventionally select content for presentation to their users based on the users' affinity for various items or topics that may be associated with the content. Based on information describing items or topics included in content received from online system users and/or content with which online system users have interacted, online systems may infer affinities of their users for the items or topics and select content associated with these items or topics for presentation to the users. However, if content received from the users does not include descriptions of the items or topics associated with the content, online systems may be unable to identify items or topics for which their users are likely to have affinities and hence may fail to present relevant content to their users.

To more accurately select content items for presentation to online system users for which the users are likely to have affinities, an online system updates a profile of an online system user to include an affinity of the user for an item based on an image of the item included in content received from the user and/or based on an image of the item included in content with which the user interacted. More specifically, the online system receives a content item including an image from a content-providing user of the online system, in which the content item is to be presented to one or more viewing users of the online system. The online system also may receive an interaction with the content item from a viewing user of the online system. The online system then accesses a machine-learning model that is trained based on a set of images of one or more items associated with an entity having a presence on the online system and a set of attributes of each of the images. The online system applies the trained machine-learning model to predict a probability that the content item includes an image of an item associated with the entity, in which the probability is predicted based on one or more attributes of the image included in the content item. The online system then updates a profile of a subject user (i.e., the content-providing user and/or the viewing user) to include an affinity of the subject user for the item based on the predicted probability. Upon determining an opportunity to present content to the subject user, the online system selects one or more content items for presentation to the subject user based at least in part on the profile of the subject user and sends the selected content item(s) for presentation to the subject user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
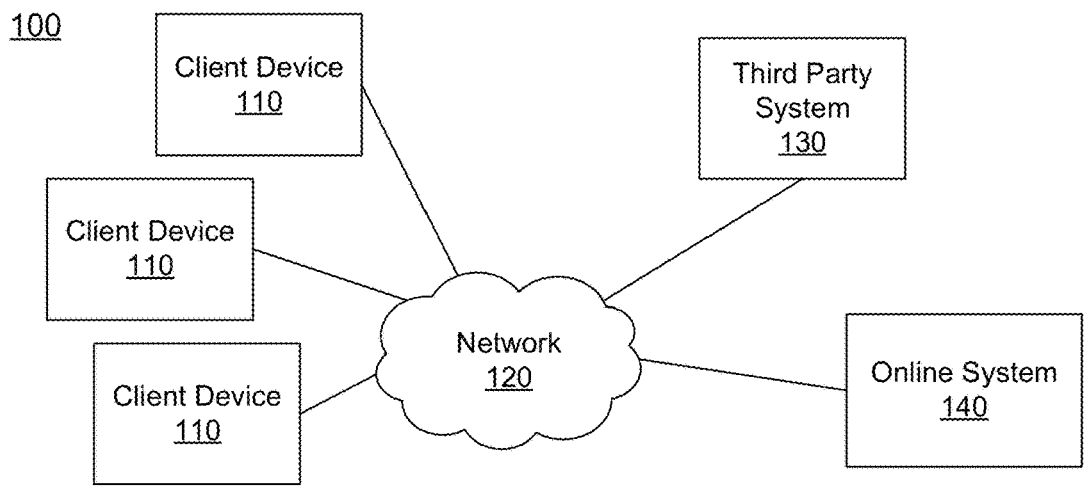
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
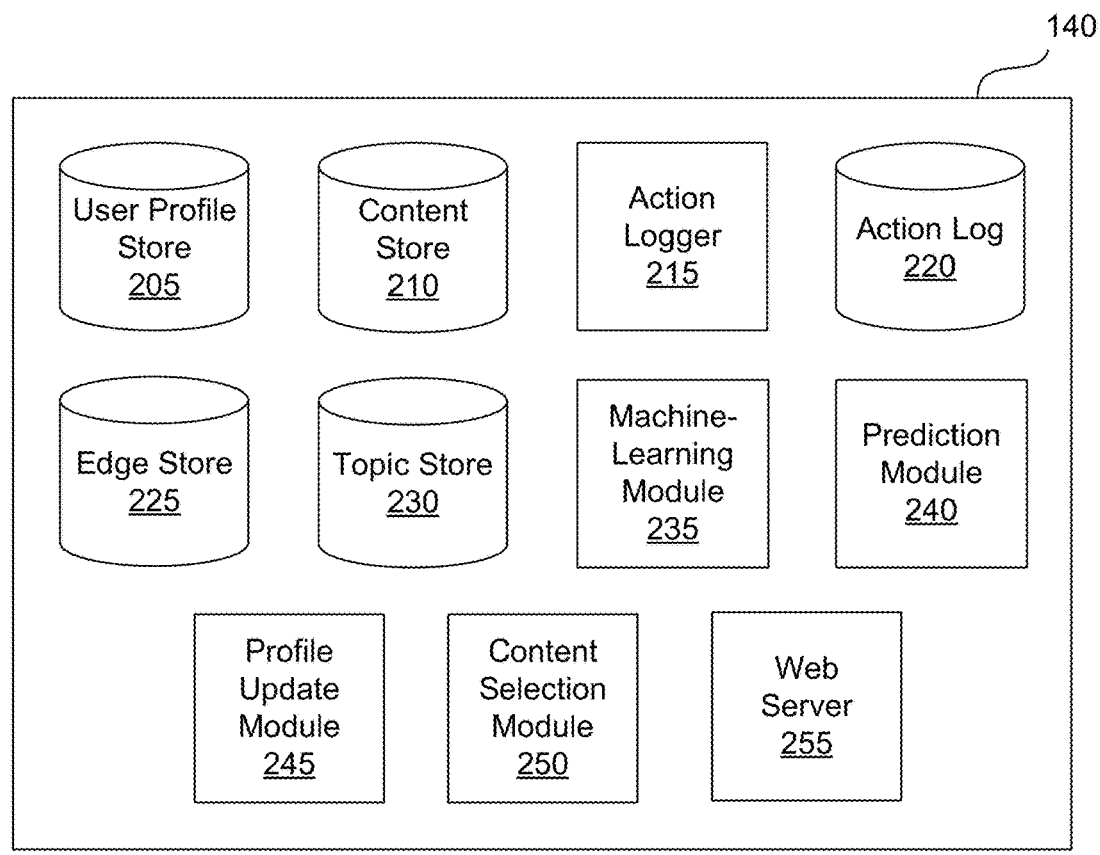
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a topic store 230, a machine-learning module 235, a prediction module 240, a profile update module 245, a content selection module 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image, with information identifying the images in which a user is tagged stored in the user profile of the user. A user profile in the user profile store 205 also may maintain references to actions by the corresponding user performed on content items in the content store 210 and stored in the action log 220.

Information stored in the user profile store 205 may be updated by the profile update module 245 (described below) to include affinities of users of the online system 140 for various items. Examples of such items include products such as clothing items, electronic items, shoes, cars, or any other suitable types of items. For example, suppose that a user of the online system 140 has an affinity for a particular hat (e.g., a hat of a specific style, brand, color, etc.). In this example, information stored in the user profile store 205 may be updated to include an affinity of the user for the hat by storing information identifying the user (e.g., a username associated with the user) in association with information identifying the hat (e.g., a product identifier). In some embodiments, items for which users of the online system 140 have affinities may be associated with entities having a presence on the online system 140. For example, if an item is a product, an entity associated with the product may be a merchant, a manufacturer, or a distributor of the product. In embodiments in which an item for which an online system user has an affinity is associated with an entity having a presence on the online system 140, information stored in the user profile store 205 describing the user's affinity for the item may indicate that the item is associated with the entity. For example, information identifying a user of the online system 140 may be stored in the user profile store 205 in association with information identifying a product for which the user has an affinity and information identifying a merchant that sells the product (e.g., a username associated with the merchant). In some embodiments, information stored in the user profile store 205 also may be updated by the profile update module 245 to include an online system user's dislike for an item associated with an entity having a presence on the online system 140, as further described below.

Information stored in the user profile store 205 also may be updated by the profile update module 245 to include affinities of users of the online system 140 for various topics. Examples of such topics include types of products, styles of clothing, genres of music, types of cuisine, etc. For example, if a user of the online system 140 has an affinity for hats of various styles, colors, and/or brands, information stored in the user profile store 205 may be updated to include an affinity of the user for the topic of hats (e.g., by storing information identifying the user in association with information describing the topic of hats). In some embodiments, information stored in the user profile store 205 also may be updated by the profile update module 245 to include an online system user's dislike for a topic, as further described below.

Information stored in the user profile store 205 also may be updated by the profile update module 245 to include affinities of users of the online system 140 for items used by other individuals. For example, suppose that a user of the online system 140 has an affinity for Victorian dresses worn by individuals other than the user. In this example, information stored in the user profile store 205 may be updated to include an affinity of the user for Victorian dresses worn by individuals other than the user. Information stored in the user profile store 205 also may be updated by the profile update module 245 to include affinities of users of the online system 140 for topics associated with items used by other individuals. In the above example, if the user also has an affinity for hats and shoes related to the Victorian era worn by individuals other than the user, the user profile store 205 also may be updated to include an affinity of the user for Victorian fashion worn by individuals other than the user.

Information stored in the user profile store 205 also may include one or more embeddings that each describes an affinity of an online system user for an item associated with an entity having a presence on the online system 140. An embedding may be generated and stored in the user profile store 205 by the profile update module 245. For example, suppose that an online system user has an affinity for jeans. In this example, the profile update module 245 may generate an embedding in a user-product embedding space that describes the user's affinity for jeans and may store the embedding in the user profile store 205. In embodiments in which information stored in the user profile store 205 is updated to include affinities of users of the online system 140 for items used by other individuals, embeddings describing these affinities also may be generated by the profile update module 245 and stored in the user profile store 205. In the above example, if the user also has an affinity for jeans worn by individuals other than the user, the profile update module 245 may generate an additional embedding in the user-product embedding space that describes the user's affinity for jeans worn by individuals other than the user and may store the embedding in the user profile store 205.

While user profiles in the user profile store 205 frequently are associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., a brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The topic store 230 stores information describing various topics that may be associated with items for which users of the online system 140 have affinities. Examples of such topics include categories or types of items such as categories of electronics or other products, styles of clothing, genres of movies, etc. For example, an item corresponding to a sports car of a specific make and model may be associated with the topic of cars. A topic stored in the topic store 230 also may include more specific topics (i.e., subtopics). In the above example, the topic of cars may include additional topics that are more specific than the topic of cars (e.g., sports cars, trucks, vans, sedans, SUVs, etc.).

In some embodiments, topics stored in the topic store 230 are arranged in one or more hierarchies. In such embodiments, a hierarchy includes multiple nodes representing topics and edges connecting the nodes represent relationships between the topics. Furthermore, different levels of a hierarchy represent different levels of specificity, such that topics represented by nodes at a lowest level of the hierarchy correspond to a most specific level of specificity and topics represented by nodes at a highest level of the hierarchy correspond to a most general level of specificity. For example, suppose that in a hierarchy of topics, a node at a highest level of the hierarchy represents the topic of hats. In this example, each additional node connected by an edge to a node at a higher level of the hierarchy may represent a more specific topic (e.g., a style of hat, a color of hat, a material of hat, a brand of hat, etc.) within a topic corresponding to the node at the higher level to which it is connected. The topic store 230 is further described below in conjunction with FIGS. 3 and 4.

The machine-learning module 235 may train an item detection model to predict a probability that a content item includes an image of an item (e.g., a product) associated with an entity (e.g., a merchant) having a presence on the online system 140. The item detection model may be a convolutional neural network, a deep learning model, or any other suitable machine-learning model. In some embodiments, the machine-learning module 235 may train multiple machine-learning models that collectively perform the function of the item detection model. In various embodiments, the machine-learning module 235 may train the item detection model based on a training set of images, in which some of the training set of images include images of items associated with entities having a presence on the online system 140 and some of the training set of images do not. In such embodiments, the machine-learning module 235 also may train the item detection model based on attributes of each of the training set of images and information indicating whether each of the training set of images corresponds to an item associated with an entity having a presence on the online system 140. Attributes of an image that may be used to train the item detection model include a set of pixel values describing a size of the image, a resolution of the image, a brightness of one or more pixels within the image, red, green and blue color component intensities of one or more pixels within the image, etc.

To illustrate an example of how the machine-learning module 235 may train the item detection model, suppose that the online system 140 receives product catalogs associated with various merchants having a presence on the online system 140, in which each product catalog includes images of products sold by the merchants. In this example, the images of the products may be included in a training set of images that also includes other images (e.g., images of users of the online system 140, images of inanimate objects, images of landscapes, etc.). Continuing with this example, the machine-learning module 235 may use the training set of images to train the item detection model to predict a probability that a content item includes an image of a product sold by a merchant based on pixel values of each image included in the training set of images as well as information indicating whether each of these images corresponds to a product sold by a merchant.

In some embodiments, once trained, the item detection model first detects an object included in a content item and then predicts a probability that the object corresponds to a specific item associated with an entity having a presence on the online system 140. To do so, the item detection model detects one or more objects within an image included in the content item by applying one or more object detection methods to the image. The item detection model also may identify locations of objects detected within the image (e.g., by generating a bounding box surrounding each object). In various embodiments, the item detection model uses one or more object detection methods to identify a type of item corresponding to each object detected within the image. For example, using an object detection method, the item detection model associates different categories or types with objects based on attributes of the objects, such that the item detection model associates a category or a type (e.g., a type of item) with each object detected within an image based on attributes of the object. The item detection model then makes one or more predictions that each correspond to a probability that an object detected within the image corresponds to a specific item associated with an entity having a presence on the online system 140 by comparing the object to images of items (e.g., images of products included in a product catalog) associated with one or more entities having a presence on the online system 140. The item detection model then outputs one or more probabilities that each object detected within the image matches different items associated with one or more entities having a presence on the online system 140.

In embodiments in which the item detection model identifies a type of item corresponding to an object detected within an image included in a content item, the machine-learning module 235 may train the item detection model based on a training set of images including images of different types of items. In some embodiments, the training set of images may include publicly available information identifying different types of items. The item detection model also may be trained based on attributes that characterize each of the training set of images (e.g., shapes, edges, curves, etc.) as well as information indicating a type of item corresponding to each of the training set of images.

In embodiments in which the item detection model predicts a probability that an object detected within an image corresponds to a specific item associated with an entity having a presence on the online system 140, the machine-learning module 235 may train the item detection model based on comparisons of objects detected within images to images of items associated with one or more entities having a presence on the online system 140. In some embodiments, the machine-learning module 235 trains the item detection model to predict a probability that an object detected within an image matches an item associated with an entity having a presence on the online system 140 based on prior matching of objects detected within images to different items associated with entities having a presence on the online system 140. For example, the machine-learning module 235 applies a label to an object detected within an image indicating that the object matches an item associated with an entity based on attributes of the object (e.g., logos, trademarks, emblems, icons, patterns, textures, prints, etc.). From the labeled attributes of objects extracted from images, the machine-learning module 235 trains the item detection model using any suitable training method or combination of training methods (e.g., back propagation if the item detection model is a neural network, curve fitting techniques if the item detection model is a linear regression model, etc.).

In various embodiments, the machine-learning module 235 also may train a user identification model to predict a probability that a content item includes an image of a user of the online system 140. Similar to the item detection model described above, the user identification model may be a convolutional neural network, a deep learning model, or any other suitable machine-learning model. Also similar to the item detection model, in some embodiments, the machine-learning module 235 may train multiple machine-learning models that collectively perform the function of the user identification model. In some embodiments, the machine-learning module 235 may train the user identification model based on a training set of images, in which some of the training set of images include images of users of the online system 140 and some of the training set of images do not. In such embodiments, the machine-learning module 235 also may train the user identification model based on attributes of each of the training set of images and information indicating whether each of the training set of images corresponds to a user of the online system 140. Similar to the item detection model, attributes of an image that may be used to train the user identification model include a set of pixel values associated with the image.

To illustrate an example of how the machine-learning module 235 may train the user identification model, suppose that the online system 140 receives images of users of the online system 140 (e.g., images to be included in user profiles of the users, images included in content items in which the users are tagged, etc.). In this example, the images of the users may be included in a training set of images that also includes other images (e.g., images of inanimate objects, images of landscapes, etc.). Continuing with this example, the machine-learning module 235 may use the training set of images to train the user identification model to predict a probability that a content item includes an image of an online system user based on pixel values of each image included in the training set of images as well as information indicating whether each of these images corresponds to a user of the online system 140.

In some embodiments, once trained, the user identification model first detects an image of a face included in a content item and then predicts a probability that the face corresponds to a face of a specific user of the online system 140. To do so, the user identification model detects one or more faces within an image included in the content item by applying one or more facial detection methods to the image. The user identification model also may identify locations of faces detected within the image (e.g., by generating a bounding box surrounding each face). In various embodiments, the user identification model uses one or more facial detection methods to identify a type of face corresponding to each face detected within the image. For example, using a facial detection method, the user identification model associates different categories or types with faces based on attributes of the faces, such that the user identification model associates a category or a type (e.g., a human face, a dog face, etc.) with each face detected within an image based on attributes of the face. The user identification model then makes one or more predictions that each correspond to a probability that a face detected within the image corresponds to a face of a specific user of the online system 140 by comparing the face to images of faces of users of the online system 140 (e.g., profile images stored in the user profile store 205, images stored in the content store 210 in which the users are tagged, etc.). The user identification model then outputs one or more probabilities that each face detected within the image matches different faces of one or more users of the online system 140.

In embodiments in which the user identification model identifies a type of face corresponding to a face detected within an image included in a content item, the machine-learning module 235 may train the user identification model based on a training set of images including images of different types of faces. In some embodiments, the training set of images may include publicly available information identifying different types of faces. The user identification model also may be trained based on attributes that characterize each of the training set of images (e.g., types of facial features, shapes, sizes, colors, and locations of facial features, etc.) as well as information indicating a type of face corresponding to each of the training set of images.

In embodiments in which the user identification model predicts a probability that a face detected within an image corresponds to a face of a specific user of the online system 140, the machine-learning module 235 may train the user identification model based on comparisons of faces detected within images to images of users of the online system 140. In some embodiments, the machine-learning module 235 trains the user identification model to predict a probability that a face detected within an image matches a face of an online system user based on prior matching of faces detected within images to different users. For example, the machine-learning module 235 applies a label to a face detected within an image indicating that the face matches a face of an online system user based on attributes of the face (e.g., shapes and sizes of the eyes, nose, cheekbones, and other facial features, distances between facial features, etc.). From the labeled attributes of faces extracted from images, the machine-learning module 235 trains the user identification model using any suitable training method or combination of training methods (e.g., back propagation if the user identification model is a neural network, curve fitting techniques if the user identification model is a linear regression model, etc.). The functionality of the machine-learning module 235 is further described below in conjunction with FIG. 3.

The prediction module 240 accesses (e.g., as shown in step 315 of FIG. 3) the trained item detection model and applies (e.g., as shown in step 320 of FIG. 3) the item detection model to predict a probability that a content item includes an image of an item associated with an entity having a presence on the online system 140. In some embodiments, the item detection model may be trained by the machine-learning module 235, while in other embodiments, the item detection model may be trained by a third-party system 130. To use the item detection model to predict a probability that a content item includes an image of an item associated with an entity having a presence on the online system 140, the prediction module 240 provides an input to the item detection model that includes one or more attributes of an image included in the content item (e.g., a set of pixel values of one or more pixels within the image). Based on these attributes, the item detection model predicts a probability that the content item includes an image of an item associated with an entity having a presence on the online system 140. The prediction module 240 then receives an output from the item detection model corresponding to the predicted probability. In some embodiments, the prediction module 240 may access and apply multiple machine-learning models that collectively perform the function of the item detection model in an analogous manner.

The prediction module 240 also may access the trained user identification model and apply the user identification model to predict a probability that a content item includes an image of a user of the online system 140. In some embodiments, the user identification model may be trained by the machine-learning module 235, while in other embodiments, the user identification model may be trained by a third-party system 130. In various embodiments, the prediction module 240 may access and apply the user identification model to predict a probability that a content item includes an image of a user of the online system 140 in response to receiving an output from the item detection model indicating that the content item includes an image of an item associated with an entity having a presence on the online system 140 (e.g., if the probability predicted by the item detection model is at least a threshold probability). To use the user identification model to predict a probability that a content item includes an image of a user of the online system 140, the prediction module 240 provides an input to the user identification model that includes one or more attributes of an image included in the content item (e.g., a set of pixel values of one or more pixels within the image). Based on these attributes, the user identification model predicts a probability that the content item includes an image of a user of the online system 140. The prediction module 240 then receives an output from the user identification model corresponding to the predicted probability. In some embodiments, the prediction module 240 may access and apply multiple machine-learning models that collectively perform the function of the user identification model in an analogous manner. The functionality of the prediction module 240 is further described below in conjunction with FIG. 3.

The profile update module 245 updates (e.g., as shown in step 325 of FIG. 3) a profile of a user of the online system 140 to include an affinity of the user for an item associated with an entity having a presence on the online system 140 based on a probability predicted by the item detection model. The profile update module 245 may do so in response to determining that the probability predicted by the item detection model is at least a threshold probability. For example, once the item detection model has predicted a probability that a content item received from a user of the online system 140 includes an image of an item associated with an entity having a presence on the online system 140, the profile update module 245 may compare the predicted probability to a threshold probability. In this example, if the predicted probability is at least the threshold probability, the profile update module 245 may update a profile of the user in the user profile store 205 to include an affinity of the user for the item.

The profile update module 245 also may update a profile of a user of the online system 140 to include an affinity of the user for a topic associated with one or more items associated with one or more entities having a presence on the online system 140. The profile update module 245 may do so by comparing a probability predicted by the item detection model that a content item includes an image of an item associated with an entity having a presence on the online system 140 to one or more threshold probabilities, in which each threshold probability is associated with a topic. The profile update module 245 may then determine a topic associated with the content item based on the comparison and update a profile of a user of the online system 140 to include an affinity of the user for the topic. For example, suppose that the item detection model has predicted a probability that a content item includes an image of an item associated with an entity having a presence on the online system 140, in which the item corresponds to a pair of shoes of a particular style and color. In this example, if the probability is less than a threshold probability, the profile update module 245 may access a hierarchy of topics (e.g., stored in the topic store 230) and compare the predicted probability to a probability associated with each topic (e.g., styles, colors, brands, and/or materials of shoes), starting with topics at a most specific level of the hierarchy. In this example, if the predicted probability is at least a threshold probability associated with a topic, the profile update module 245 may determine that the content item is associated with the topic. Continuing with this example, the profile update module 245 may then update a profile of a user from whom the content item was received to include an affinity of the user for the topic.

The profile update module 245 also may update (e.g., as shown in step 325 of FIG. 3) a profile of a user of the online system 140 to include an affinity of the user for an item associated with an entity having a presence on the online system 140 based on a probability predicted by the user identification model. In some embodiments, the profile update module 245 may determine whether the probability predicted by the user identification model is at least a threshold probability. In such embodiments, based on the determination, the profile update module 245 may update a profile of a user of the online system 140 to include an affinity of the user for the item or an affinity of the user for the item used by individuals other than the user. For example, suppose that the item detection model has predicted a first probability that a content item received from a user of the online system 140 includes an image of an article of clothing associated with an entity having a presence on the online system 140 and that the first probability is at least a first threshold probability. In this example, suppose also that user identification model has predicted a second probability that the content item includes an image of the user from whom the content item was received. In this example, if the profile update module 245 determines that the second probability is at least a second threshold probability, the profile update module 245 may update a profile of the user in the user profile store 205 to describe a taste of the user in the article of clothing worn by the user. Alternatively, in the above example, if the profile update module 245 determines that the second probability is less than the second threshold probability, the profile update module 245 may update the profile of the user to describe a taste of the user in the article of clothing worn by individuals other than the user.

The profile update module 245 also may update a profile of a user of the online system 140 to include an affinity of the user for a topic associated with one or more items associated with one or more entities having a presence on the online system 140 based on a probability predicted by the user identification model. As described above, in some embodiments, the profile update module 245 may determine a topic associated with a content item. In such embodiments, based on a probability predicted by the user identification model, the profile update module 245 may update a profile of a user of the online system 140 to include an affinity of the user for a topic associated with an item used by the user or an affinity of the user for a topic associated with an item used by individuals other than the user. For example, suppose that the profile update module 245 determines that a content item is associated with the topic of vintage clothing. In this example, if the profile update module 245 also determines that a probability predicted by the user identification model that the content item includes an image of an online system user from whom the content item was received is at least a threshold probability, the profile update module 245 may update a profile of the user in the user profile store 205 to describe a taste of the user in vintage clothing worn by the user. Alternatively, in the above example, if the profile update module 245 determines that the probability predicted by the user identification model is less than the threshold probability, the profile update module 245 may update the profile of the user to describe a taste of the user in vintage clothing worn by individuals other than the user.

In some embodiments, the profile update module 245 may update (e.g., as shown in step 325 of FIG. 3) a profile of a user of the online system 140 to include an affinity of the user for an item associated with an entity having a presence on the online system 140 by generating an embedding describing the affinity of the user for the item and then storing the embedding in the user profile store 205. For example, suppose that the item detection model has predicted a first probability that a content item includes an image of an item corresponding to a bomber jacket and that the first probability is at least a first threshold probability. In this example, suppose also that the user identification model has predicted a second probability that the content item includes an image of a user of the online system 140 who interacted with the content item and that the second probability is at least a second threshold probability. In the above example, the profile update module 245 may generate an embedding in a user-product embedding space that describes the user's affinity for bomber jackets worn by the user and may store the embedding in the user profile store 205. Alternatively, in the above example, if the second probability is less than the second threshold probability, the profile update module 245 may generate an embedding in a user-product embedding space that describes the user's affinity for bomber jackets worn by individuals other than the user and may store the embedding in the user profile store 205.

In embodiments in which an affinity of an online system user for an item associated with an entity having a presence on the online system 140 is described by an embedding, the profile update module 245 also may update a profile of the user to include an affinity of the user for a topic associated with the item based on the embedding. In such embodiments, the profile update module 245 may determine a topic associated with a cluster of embeddings and may update a profile of the user to include an affinity of the user for the topic based on the determination. For example, suppose that different embeddings in a user-product embedding space correspond to different products (e.g., evening gowns, tuxedos, jeans, etc.) for which users of the online system 140 have affinities. In this example, different clusters of embeddings may correspond to different styles of clothing (e.g., gothic, casual, etc.), such that embeddings that are closer together correspond to items that are more likely to belong to the same style of clothing than embeddings that are further apart. Continuing with this example, if embeddings stored in the user profile store 205 describe an online system user's affinity for items such as crested blazers and striped ties, the profile update module 245 may determine that these embeddings are included in a cluster corresponding to a preppy style of clothing. In the above example, based on the determination, the profile update module 245 may update a profile of the user to include an affinity of the user for the preppy style of clothing.

In some embodiments, the profile update module 245 also may update a profile of a user of the online system 140 to include the user's dislike for an item associated with an entity having a presence on the online system 140 and/or for a topic associated with one or more items associated with one or more entities having a presence on the online system 140. In such embodiments, the profile update module 245 may do so based on a probability predicted by the item detection model as well as an interaction of the user with a content item. For example, suppose that a user of the online system 140 performed an interaction with a content item that indicates a dislike for the content item (e.g., unsubscribing to content created by an online system user who created the content item, reporting the content item as inappropriate, etc.). In this example, once the item detection model has predicted a probability that the content item includes an image of an item associated with an entity having a presence on the online system 140, the profile update module 245 may compare the predicted probability to a threshold probability. In the above example, if the predicted probability is at least the threshold probability, the profile update module 245 may update a profile of the user in the user profile store 205 to include the user's dislike for the item. In the above example, if the profile update module 245 also or alternatively determines a topic associated with the content item, the profile update module 245 may update the profile of the user to include the user's dislike for the topic. The functionality of the profile update module 245 is further described below in conjunction with FIGS. 3, 4, and 5.

The content selection module 250 may identify one or more candidate content items eligible for presentation to a viewing user of the online system 140. Candidate content items eligible for presentation to the viewing user are retrieved from the content store 210 or from another source by the content selection module 250, which may rank the candidate content items and select (e.g., as shown in step 335 of FIG. 3) one or more of the candidate content items for presentation to the viewing user. A candidate content item eligible for presentation to a viewing user is a content item associated with at least a threshold number of targeting criteria satisfied by characteristics of the viewing user or is a content item that is not associated with targeting criteria. In various embodiments, the content selection module 250 includes candidate content items eligible for presentation to a viewing user in one or more content selection processes, which identify a set of content items for presentation to the viewing user. For example, the content selection module 250 determines measures of relevance of various candidate content items to a viewing user based on characteristics associated with the viewing user by the online system 140 and based on the viewing user's affinity for different candidate content items. Based on the measures of relevance, the content selection module 250 selects content items for presentation to the viewing user. As an additional example, the content selection module 250 selects content items having the highest measures of relevance or having at least a threshold measure of relevance for presentation to a viewing user. Alternatively, the content selection module 250 ranks candidate content items based on their associated measures of relevance and selects content items having the highest positions in the ranking or having at least a threshold position in the ranking for presentation to a viewing user.

Content items selected for presentation to a viewing user may be associated with bid amounts. The content selection module 250 may use the bid amounts associated with candidate content items when selecting content for presentation to the viewing user. In various embodiments, the content selection module 250 determines an expected value associated with various candidate content items based on their bid amounts and selects content items associated with a maximum expected value or associated with at least a threshold expected value for presentation to a viewing user. An expected value associated with a candidate content item represents an expected amount of compensation to the online system 140 for presenting the candidate content item. For example, the expected value associated with a candidate content item is a product of the candidate content item's bid amount and a likelihood of a viewing user interacting with content from the candidate content item. The content selection module 250 may rank candidate content items based on their associated bid amounts and select content items having at least a threshold position in the ranking for presentation to a viewing user. In some embodiments, the content selection module 250 ranks both candidate content items not associated with bid amounts and candidate content items associated with bid amounts in a unified ranking based on bid amounts and measures of relevance associated with the candidate content items. Based on the unified ranking, the content selection module 250 selects content for presentation to the viewing user. Selecting content items through a unified ranking is further described in U.S. patent application Ser. No. 13/545,266, filed on Jul. 10, 2012, which is hereby incorporated by reference in its entirety.

For example, the content selection module 250 receives a request to present a feed of content to a viewing user of the online system 140. The feed may include one or more advertisements as well as other content items, such as stories describing actions associated with other online system users connected to the viewing user. The content selection module 250 accesses one or more of the user profile store 205, the content store 210, the action log 220, and the edge store 225 to retrieve information about the viewing user. For example, stories or other data associated with users connected to the viewing user are retrieved. The retrieved stories or other content items are analyzed by the content selection module 250 to identify candidate content that is likely to be relevant to the viewing user. For example, stories associated with users not connected to the viewing user or stories associated with users for which the viewing user has less than a threshold affinity are discarded as candidate content. Based on various criteria, the content selection module 250 selects one or more of the content items identified as candidate content for presentation to the viewing user. The selected content items may be included in a feed of content that is presented to the viewing user. For example, the feed of content includes at least a threshold number of content items describing actions associated with users connected to the viewing user via the online system 140.

In various embodiments, the content selection module 250 presents content to a viewing user through a newsfeed including a plurality of content items selected for presentation to the viewing user. One or more advertisements also may be included in the feed. The content selection module 250 may also determine the order in which selected content items are presented via the feed. For example, the content selection module 250 orders content items in a feed based on a likelihoods of a viewing user interacting with various content items. The functionality of the content selection module 250 is further described below in conjunction with FIG. 3.

The web server 255 links the online system 140 via the network 120 to the one or more client devices 110, as well as to the one or more third-party systems 130. The web server 255 serves web pages, as well as other content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or BlackberryOS.

Figure 3:
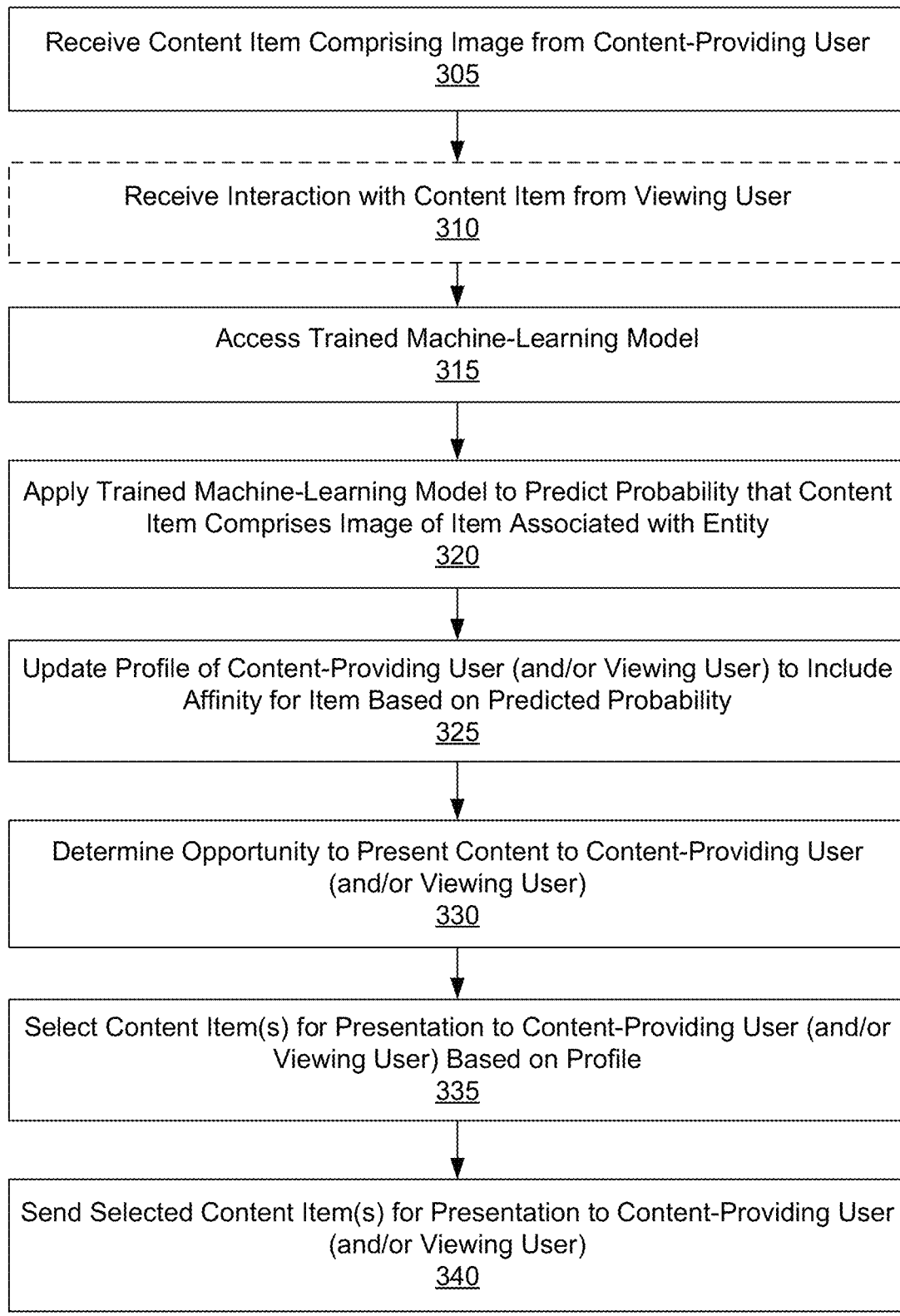
FIG. 3 is a flow chart of a method for updating a profile of an online system user to include an affinity of the user for an item based on an image of the item included in content received from the user and/or content with which the user interacted, in accordance with an embodiment.

Updating a Profile of an Online System User to Include an Affinity for an Item Based on an Image of the Item Included in Content Received from the User and/or Content with which the User Interacted FIG. 3 is a flow chart of a method for updating a profile of an online system user to include an affinity for an item based on an image of the item included in content received from the user and/or content with which the user interacted. In other embodiments, the method may include different and/or additional steps than those shown in FIG. 3. Additionally, steps of the method may be performed in a different order than the order described in conjunction with FIG. 3.

The online system 140 receives 305 a content item from a content-providing user of the online system 140, in which the content item includes an image. For example, the online system 140 may receive 305 a content item including a caption and an image from the content-providing user. In some embodiments, the content item also or alternatively may include additional data such as video data, audio data, text data (e.g., in one or more tags), one or more additional images, etc. In embodiments in which the content item includes video data, the image may be included in the video data. For example, the image may be included in one or more frames of a video included in the content item received 305 from the content-providing user.

In some embodiments, the online system 140 may receive 310 an interaction with the content item from a viewing user of the online system 140 to whom the content item was presented. Examples of types of interactions include clicking on the content item, expressing a preference for the content item, commenting on the content item, saving the content item, sharing the content item with additional users of the online system 140, unsubscribing to content created by an online system user who created the content item, reporting the content item as inappropriate, etc. For example, the online system 140 may receive 310 a comment on the content item from a viewing user of the online system 140, in which the comment includes text content and emojis describing the viewing user's enthusiasm for the content item.

The online system 140 then accesses 315 (e.g., using the prediction module 240) a trained item detection model and applies 320 (e.g., using the prediction module 240) the item detection model to predict a probability that the content item includes an image of an item associated with an entity having a presence on the online system 140. As described above, the item may be a product such as an item of clothing, an electronic item, etc. and the entity may be a merchant, a manufacturer, or a distributor of the item. As also described above, in some embodiments, the online system 140 may access and apply multiple trained machine-learning models that collectively perform the function of the item detection model.

To apply 320 the item detection model, the online system 140 provides an input to the item detection model that includes one or more attributes of the image included in the content item (e.g., a set of pixel values of one or more pixels within the image). Based on these attributes, the item detection model predicts a probability that the content item includes an image of the item associated with the entity. In some embodiments, the item detection model first detects one or more objects within the image by applying one or more object detection methods to the image. The item detection model also may identify locations of objects detected within the image (e.g., by generating a bounding box surrounding each object). In various embodiments, the item detection model uses one or more object detection methods to identify a type of item corresponding to each object detected within the image. The item detection model then makes a prediction corresponding to a probability that each object detected within the image corresponds to the item associated with the entity by comparing the object to images of items (e.g., images of products included in a catalog of products) associated with the entity. The online system 140 then receives an output from the item detection model corresponding to the predicted probability.

In some embodiments, the online system 140 also may access (e.g., using the prediction module 240) the trained user identification model and apply (e.g., using the prediction module 240) the user identification model to predict a probability that the content item includes an image of the content-providing user and/or the viewing user (henceforth referred to as the "subject user"). As described above, in some embodiments, the online system 140 may access and apply multiple trained machine-learning models that collectively perform the function of the user identification model. In various embodiments, the online system 140 may access and apply the user identification model to predict a probability that the content item includes an image of the subject user in response to receiving an output from the item detection model indicating that the content item includes an image of the item associated with the entity (e.g., if the probability predicted by the item detection model is at least a threshold probability).

To apply the user identification model, the online system 140 provides an input to the user identification model that includes one or more attributes of the image included in the content item (e.g., a set of pixel values of one or more pixels within the image). In some embodiments, the user identification model first detects an image of a face included in the content item and then predicts a probability that the face corresponds to a face of the subject user. The user identification model may detect one or more faces within the image by applying one or more facial detection methods to the image. The user identification model also may identify locations of faces detected within the image (e.g., by generating a bounding box surrounding each face). In various embodiments, the user identification model uses one or more facial detection methods to identify a type of face (e.g., a human face, a dog face, etc.) corresponding to each face detected within the image. The user identification model then makes a prediction corresponding to a probability that each face detected within the image corresponds to the face of the subject user by comparing the face to one or more images of the face of the subject user (e.g., profile images stored in the user profile store 205, images stored in the content store 210 in which the user is tagged, etc.). The online system 140 then receives an output from the user identification model corresponding to the predicted probability.

The online system 140 then updates 325 (e.g., using the profile update module 245) a profile of the subject user to include an affinity of the subject user for the item associated with the entity based on the probability predicted by the item detection model. In some embodiments, the online system 140 may do so in response to determining that the probability predicted by the item detection model is at least a threshold probability. For example, once the item detection model has predicted a probability that the content item includes an image of the item associated with the entity, the online system 140 may compare the predicted probability to a threshold probability. In this example, the online system 140 may update 325 the profile of the subject user in the user profile store 205 to include an affinity of the subject user for the item if the predicted probability is at least the threshold probability. As described above, in some embodiments, the online system 140 may update 325 a profile of the subject user by generating an embedding describing an affinity of the subject user for the item and then storing the embedding in the user profile store 205.

In some embodiments, the online system 140 also or alternatively may update (e.g., using the profile update module 245) the profile of the subject user to include an affinity of the subject user for a topic associated with one or more items associated with one or more entities having a presence on the online system 140. In such embodiments, the online system 140 may do so by comparing the probability predicted by the item detection model that the content item includes an image of the item associated with the entity to one or more threshold probabilities, in which each threshold probability is associated with a topic. The online system 140 may then determine a topic associated with the content item based on the comparison and update the profile of the subject user to include an affinity of the subject user for the topic. In some embodiments, the online system 140 may access a hierarchy of topics (e.g., stored in the topic store 230) and compare the probability predicted by the item detection model to a probability associated with each topic, starting with topics at a most specific level of the hierarchy. In such embodiments, if the probability predicted by the item detection model is at least a threshold probability associated with a topic, the online system 140 may determine that the content item is associated with the topic and the online system 140 may then update the profile of the subject user to include an affinity of the subject user for the topic.

Figure 4:
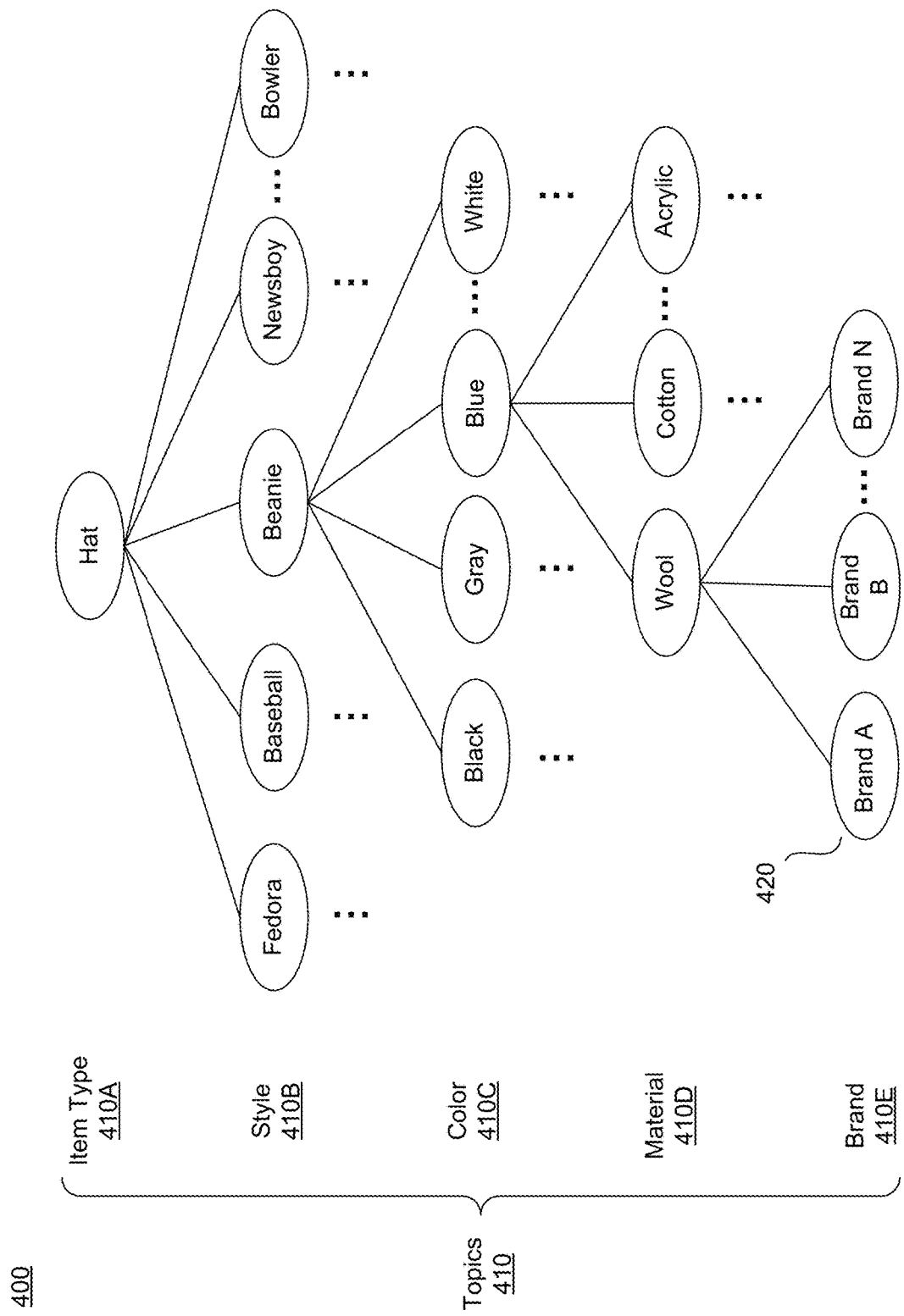
FIG. 4 is an example of a hierarchy of topics, in accordance with an embodiment.

FIG. 4 illustrates an example of a hierarchy of topics that the online system 140 may access to determine whether the content item is associated with a topic. Suppose that the item detection model has predicted a probability that the content item includes an image of the item associated with the entity, in which the item corresponds to a specific hat. If the probability is less than a threshold probability, the online system 140 may access a hierarchy 400 of topics 410, in which different levels of the hierarchy 400 represent different levels of specificity and edges connecting nodes corresponding to the topics 410 represent relationships between the topics 410. Topics 410E represented by nodes at a lowest level of the hierarchy 400 correspond to a most specific level of specificity and a topic 410A (i.e., hats) represented by a node at a highest level of the hierarchy 400 corresponds to a most general level of specificity. For example, node 420 represents a topic 410 corresponding to a hat item type 410A, of a beanie style 410B, of a blue color 410C, of a wool material 410D, and of a Brand A brand 410E. Starting with topics 410E represented by nodes at the lowest level of the hierarchy 400, the online system 140 may compare the probability predicted by the item detection model to a threshold probability associated with each topic 410E represented by a node at this level of the hierarchy 400. The online system 140 may repeat this process with threshold probabilities associated with topics 410A-D represented by nodes at increasingly higher levels of the hierarchy 400 until the probability predicted by the item detection model is at least a threshold probability associated with a topic 410. Once the online system 140 determines that the probability predicted by the item detection model is at least a threshold probability associated with a topic 410, the online system 140 may determine that the content item is associated with the topic 410 and may update a profile of the subject user to include an affinity of the subject user for the topic 410.

Figure 5:
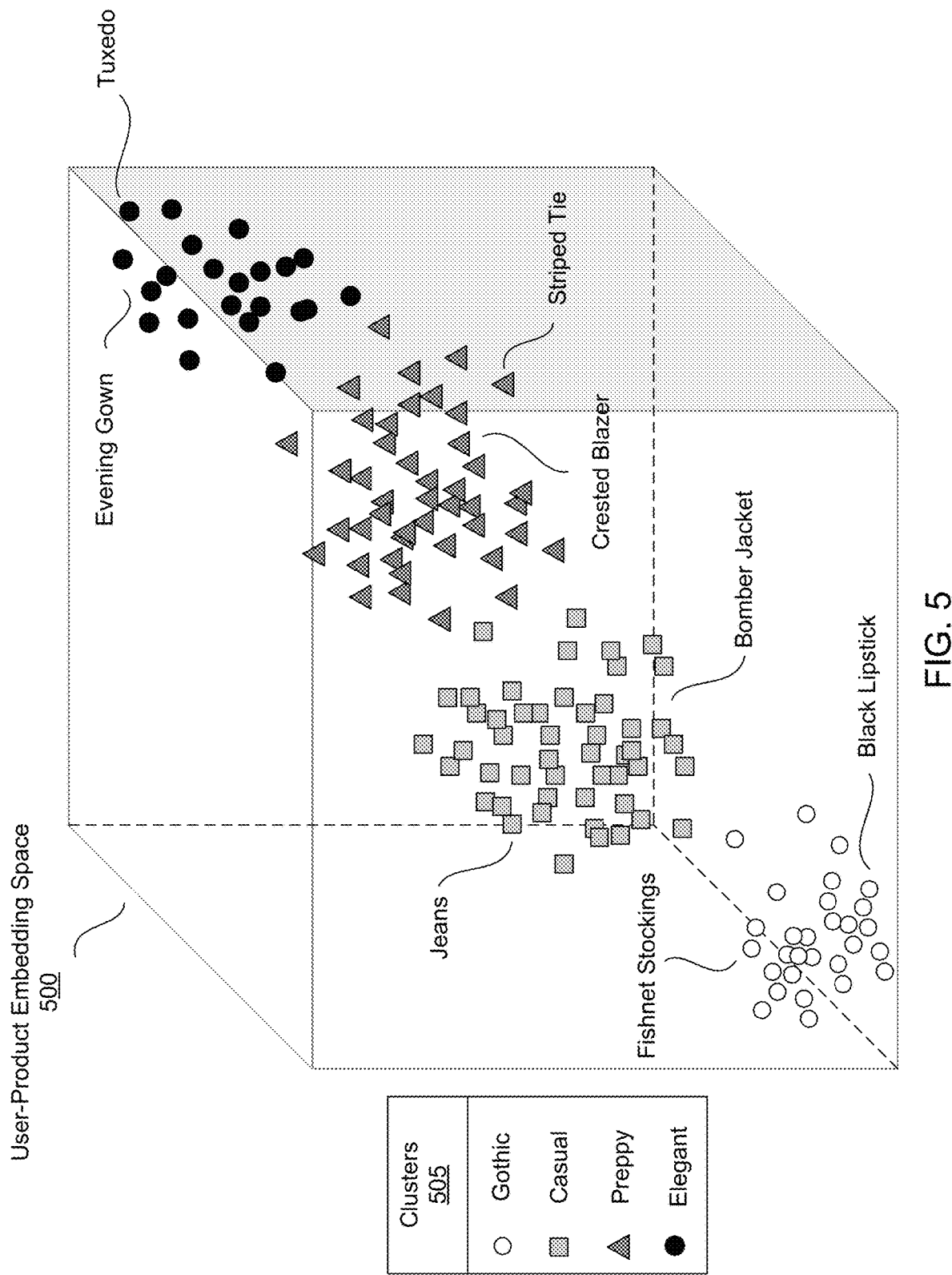
FIG. 5 is an example of a user-product embedding space, in accordance with an embodiment.

In embodiments in which an affinity of the subject user for the item associated with the entity is described by an embedding, the online system 140 also may update a profile of the subject user to include an affinity of the subject user for a topic associated with the item based on the embedding. In such embodiments, the online system 140 may determine a topic associated with a cluster of embeddings and may update the profile of the subject user to include an affinity of the subject user for the topic based on the determination. As shown in the example of FIG. 5, suppose that different embeddings in a user-product embedding space 500 correspond to different products (e.g., clothing and accessories such as evening gowns, tuxedos, jeans, etc.) for which users of the online system 140 may have affinities. In this example, different clusters 505 of embeddings may correspond to different styles of clothing (i.e., gothic, casual, preppy and elegant), such that embeddings that are closer together correspond to items that are more likely to belong to the same style of clothing than embeddings that are further apart. Continuing with this example, if embeddings stored in the user profile store 205 describe the subject user's affinity for items such as jeans and bomber jackets, the online system 140 may determine that these embeddings are included in a cluster corresponding to a casual style of clothing. In the above example, based on the determination, the online system 140 may update the profile of the subject user to include an affinity of the subject user for the casual style of clothing.

Referring back to FIG. 3, in some embodiments, the online system 140 also may update 325 (e.g., using the profile update module 245) a profile of the subject user to include an affinity of the subject user for the item associated with the entity based on a probability predicted by the user identification model. In such embodiments, the online system 140 may determine whether the probability predicted by the user identification model is at least a threshold probability. Based on the determination, the online system 140 may update 325 a profile of the subject user to include an affinity of the subject user for the item or an affinity of the subject user for the item used by other individuals. For example, suppose that the item detection model has predicted a first probability that the content item includes an image of an article of clothing associated with the entity and that the first probability is at least a first threshold probability. In this example, suppose also that the user identification model has predicted a second probability that the content item includes an image of the subject user. In the above example, if the online system 140 determines that the second probability is at least a second threshold probability, the online system 140 may update 325 the profile of the subject user in the user profile store 205 to describe a taste of the subject user in the article of clothing worn by the subject user. Alternatively, in the above example, if the online system 140 determines that the second probability is less than the second threshold probability, the online system 140 may update 325 the profile of the subject user to describe a taste of the subject user in the article of clothing worn by individuals other than the subject user.

In some embodiments, the online system 140 also may update a profile of the subject user to include an affinity of the subject user for a topic associated with one or more items associated with one or more entities having a presence on the online system 140 based on a probability predicted by the user identification model. As described above, in some embodiments, the online system 140 may determine a topic associated with the content item. In such embodiments, the online system 140 also may update a profile of the subject user to include an affinity of the subject user for a topic associated with an item used by the subject user or an affinity of the subject user for a topic associated with an item used by individuals other than the subject user based on a probability predicted by the user identification model.

In various embodiments, the online system 140 also may update (e.g., using the profile update module 245) a profile of the subject user to include a dislike for the item associated with the entity and/or for a topic associated with one or more items associated with one or more entities having a presence on the online system 140. In such embodiments, the online system 140 may do so based on a probability predicted by the item detection model as well as an interaction of the subject user with a content item. For example, suppose that the viewing user performed an interaction with the content item that indicates a dislike for the content item (e.g., unsubscribing to content created by the content-providing user, reporting the content item as inappropriate, etc.). In this example, once the item detection model has predicted a probability that the content item includes an image of the item associated with the entity, the online system 140 may compare the predicted probability to a threshold probability. In the above example, if the predicted probability is at least the threshold probability, the online system 140 may update a profile of the viewing user in the user profile store 205 to include the viewing user's dislike for the item. In the above example, if the online system 140 also or alternatively determines a topic associated with the content item, the online system 140 may update the profile of the viewing user to include the viewing user's dislike for the topic.

The online system 140 then determines 330 an opportunity to present content to the subject user. For example, the online system 140 may determine 330 an opportunity to present content to the subject user upon receiving a request from the subject user to view a feed of content items associated with a user profile of the subject user. As an additional example, the online system 140 may determine 330 an opportunity to present content to the subject user upon receiving a request from the subject user to refresh a feed of content items associated with a user profile of the subject user.

The online system 140 then selects 335 (e.g., using the content selection module 250) one or more content items for presentation to the subject user based on the updated profile of the subject user. In some embodiments, the online system 140 may select 335 the content item(s) for presentation to the subject user by first identifying a set of candidate content items eligible for presentation to the subject user. In such embodiments, the online system 140 may then predict an affinity of the subject user for each of the set of candidate content items based on the updated profile of the subject user. The online system 140 may then rank the candidate content items and select 335 one or more content items having the highest positions in the ranking or having at least a threshold position in the ranking for presentation to the subject user.

Once the online system 140 has selected 335 the content item(s), the online system 140 sends 340 the selected content item(s) for presentation to the subject user. For example, the online system 140 may include the selected content item(s) in a feed of content items that is sent for display in a display area of a client device 110 associated with the subject user. In embodiments in which the online system 140 selects (in step 335) multiple content items for presentation to the subject user, the order in which the content items are sent for display to the subject user may be determined based on the updated profile of the subject user. For example, if two content items are selected 335 for display to the subject user, the online system 140 may include the first content item in a more prominent position of a feed of content items and include the second content item in a less prominent position of the feed of content items if the online system 140 predicts that the subject user is more likely to have a greater affinity for the first content item than for the second content item based on the updated profile of the subject user. In this example, the online system 140 may then send 340 the feed of content items for display to the subject user.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving a content item comprising an image from a content-providing user of an online system, wherein the content item is to be presented to one or more viewing users of the online system;
   accessing a trained machine-learning model, the trained machine-learning model trained based at least in part on a set of images of one or more items associated with an entity having a presence on the online system and a set of attributes of each of the set of images;
   applying the trained machine-learning model to predict a probability that the content item comprises an image of an item associated with the entity, the probability predicted based at least in part on one or more attributes of the image comprising the content item;
   updating a profile of the content-providing user to include an affinity of the content-providing user for the item associated with the entity based at least in part on the predicted probability;
   determining an opportunity to present content to the content-providing user;
   selecting one or more content items for presentation to the content-providing user based at least in part on the profile of the content-providing user, wherein selecting the one or more content items for presentation to the content-providing user comprises:
   identifying a set of candidate content items eligible for presentation to the content-providing user;
   predicting an affinity of the content-providing user for each of the set of candidate content items based at least in part on the profile of the content-providing user, and
   selecting the one or more content items from the set of candidate content items for presentation to the content-providing user based at least in part on the predicted affinity of the content-providing user for each of the set of candidate content items; and
   sending the selected one or more content items for presentation to the content-providing user.

2. The method of claim 1, further comprising:
   accessing an additional trained machine-learning model, the additional trained machine-learning model trained based at least in part on an additional set of images of the content-providing user maintained in the online system and a set of attributes of each of the additional set of images; and
   applying the additional trained machine-learning model to predict an additional probability that the content item comprises an image of the content-providing user, the probability predicted based at least in part on the one or more attributes of the image comprising the content item.

3. The method of claim 2, wherein updating the profile of the content-providing user to include the affinity of the content-providing user for the item associated with the entity is further based at least in part on the additional probability.

4. The method of claim 3, wherein the affinity of the content-providing user for the item associated with the entity describes one or more of: a taste of the content-providing user in clothing worn by the content-providing user and a taste of the content-providing user in clothing worn by individuals other than the content-providing user.

5. The method of claim 1, wherein updating the profile of the content-providing user to include the affinity of the content-providing user for the item associated with the entity comprises:
   determining whether the predicted probability is at least a threshold probability;
   responsive to determining that the predicted probability is at least the threshold probability, generating an embedding describing the affinity of the content-providing user for the item associated with the entity; and
   storing the embedding in association with the profile of the content-providing user.

6. The method of claim 1, wherein updating a profile of the content-providing user comprises:
   comparing the predicted probability to one or more threshold probabilities, wherein each of the one or more threshold probabilities is associated with a topic and the topic is associated with one or more items associated with one or more entities having a presence on the online system;
   determining a topic associated with the content item based at least in part on the comparing; and
   updating the profile of the content-providing user to include an affinity of the content-providing user for the topic.

7. The method of claim 1, further comprising:
   receiving an interaction with the content item from a viewing user of the online system;
   updating an additional profile of the viewing user to include an affinity of the viewing user for the item associated with the entity based at least in part on the predicted probability;
   determining an opportunity to present content to the viewing user;
   selecting one or more additional content items for presentation to the viewing user based at least in part on the additional profile of the viewing user; and
   sending the selected one or more additional content items for presentation to the viewing user.

8. The method of claim 7, wherein updating the additional profile of the viewing user to include the affinity of the viewing user for the item associated with the entity comprises:
- comparing the predicted probability to one or more threshold probabilities, wherein each of the one or more threshold probabilities is associated with a topic and the topic is associated with one or more items associated with one or more entities having a presence on the online system;
- determining a topic associated with the content item based at least in part on the comparing; and
- updating the additional profile of the viewing user to include an affinity of the viewing user for the topic.

9. The method of claim 7, wherein selecting the one or more additional content items for presentation to the viewing user comprises:
- identifying a set of candidate content items eligible for presentation to the viewing user;
- predicting an affinity of the viewing user for each of the set of candidate content items based at least in part on the additional profile of the viewing user; and
- selecting the one or more additional content items from the set of candidate content items for presentation to the viewing user based at least in part on the predicted affinity of the viewing user for each of the set of candidate content items.

10. A computer program product comprising a computer readable storage medium having instructions encoded thereon that, when executed by a processor, cause the processor to:
- receive a content item comprising an image from a content-providing user of an online system, wherein the content item is to be presented to one or more viewing users of the online system;
- access a trained machine-learning model, the trained machine-learning model trained based at least in part on a set of images of one or more items associated with an entity having a presence on the online system and a set of attributes of each of the set of images;
- apply the trained machine-learning model to predict a probability that the content item comprises an image of an item associated with the entity, the probability predicted based at least in part on one or more attributes of the image comprising the content item;
- update a profile of the content-providing user to include an affinity of the content-providing user for the item associated with the entity based at least in part on the predicted probability;
- determine an opportunity to present content to the content-providing user;
- select one or more content items for presentation to the content-providing user based at least in part on the profile of the content-providing user, wherein select the one or more content items for presentation to the content-providing user comprises:
  - identify a set of candidate content items eligible for presentation to the content-providing user,
  - predict an affinity of the content-providing user for each of the set of candidate content items based at least in part on the profile of the content-providing user, and
  - select the one or more content items from the set of candidate content items for presentation to the content-providing user based at least in part on the predicted affinity of the content-providing user for each of the set of candidate content items; and
- send the selected one or more content items for presentation to the content-providing user.

11. The computer program product of claim 10, wherein the computer-readable storage medium further has instructions encoded thereon that, when executed by the processor, cause the processor to:
- access an additional trained machine-learning model, the additional trained machine-learning model trained based at least in part on an additional set of images of the content-providing user maintained in the online system and a set of attributes of each of the additional set of images; and
- apply the additional trained machine-learning model to predict an additional probability that the content item comprises an image of the content-providing user, the probability predicted based at least in part on the one or more attributes of the image comprising the content item.

12. The computer program product of claim 11, wherein update the profile of the content-providing user to include the affinity of the content-providing user for the item associated with the entity is further based at least in part on the additional probability.

13. The computer program product of claim 12, wherein the affinity of the content-providing user for the item associated with the entity describes one or more of: a taste of the content-providing user in clothing worn by the content-providing user and a taste of the content-providing user in clothing worn by individuals other than the content-providing user.

14. The computer program product of claim 10, wherein update the profile of the content-providing user to include the affinity of the content-providing user for the item associated with the entity comprises:
- determine whether the predicted probability is at least a threshold probability;
- responsive to determining that the predicted probability is at least the threshold probability, generate an embedding describing the affinity of the content-providing user for the item associated with the entity; and
- store the embedding in association with the profile of the content-providing user.

15. The computer program product of claim 10, wherein update a profile of the content-providing user comprises:
- compare the predicted probability to one or more threshold probabilities, wherein each of the one or more threshold probabilities is associated with a topic and the topic is associated with one or more items associated with one or more entities having a presence on the online system;
- determine a topic associated with the content item based at least in part on the comparing; and
- update the profile of the content-providing user to include an affinity of the content-providing user for the topic.

16. The computer program product of claim 10, wherein the computer-readable storage medium further has instructions encoded thereon that, when executed by the processor, cause the processor to:
- receive an interaction with the content item from a viewing user of the online system;
- update an additional profile of the viewing user to include an affinity of the viewing user for the item associated with the entity based at least in part on the predicted probability;
- determine an opportunity to present content to the viewing user;

select one or more additional content items for presentation to the viewing user based at least in part on the additional profile of the viewing user; and send the selected one or more additional content items for presentation to the viewing user.

17. The computer program product of claim 16, wherein update the additional profile of the viewing user to include the affinity of the viewing user for the item associated with the entity comprises:

compare the predicted probability to one or more threshold probabilities, wherein each of the one or more threshold probabilities is associated with a topic and the topic is associated with one or more items associated with one or more entities having a presence on the online system;

determine a topic associated with the content item based at least in part on the comparing; and update the additional profile of the viewing user to include an affinity of the viewing user for the topic.

18. The computer program product of claim 16, wherein select the one or more additional content items for presentation to the viewing user comprises:

identify a set of candidate content items eligible for presentation to the viewing user;

predict an affinity of the viewing user for each of the set of candidate content items based at least in part on the additional profile of the viewing user; and select the one or more additional content items from the set of candidate content items for presentation to the viewing user based at least in part on the predicted affinity of the viewing user for each of the set of candidate content items.

19. A method comprising:

receiving a content item comprising an image from a content-providing user of an online system, wherein the content item is to be presented to one or more viewing users of the online system;

accessing a trained machine-learning model, the trained machine-learning model trained based at least in part on a set of images of one or more items associated with an entity having a presence on the online system and a set of attributes of each of the set of images;

applying the trained machine-learning model to predict a probability that the content item comprises an image of an item associated with the entity, the probability predicted based at least in part on one or more attributes of the image comprising the content item;

updating a profile of the content-providing user to include an affinity of the content-providing user for the item associated with the entity based at least in part on the predicted probability, wherein updating a profile of the content-providing user comprises:

comparing the predicted probability to one or more threshold probabilities, wherein each of the one or more threshold probabilities is associated with a topic and the topic is associated with one or more items associated with one or more entities having a presence on the online system, determining a topic associated with the content item based at least in part on the comparing, and updating the profile of the content-providing user to include an affinity of the content-providing user for the topic;

determining an opportunity to present content to the content-providing user;

selecting one or more content items for presentation to the content-providing user based at least in part on the profile of the content-providing user; and sending the selected one or more content items for presentation to the content-providing user.

* * * * *